(12) United States Patent
Selby

(10) Patent No.: US 7,540,070 B1
(45) Date of Patent: Jun. 2, 2009

(54) WIRE HOOK AND BUNGEE CORD WITH TRANSVERSE PIN IN MOLDED BASE

(75) Inventor: Ricky W. Selby, Moosup, CT (US)

(73) Assignee: Keeper Corporation, North Windham, CT (US)

( * ) Notice: Subject to any disclaimer, the term of this patent is extended or adjusted under 35 U.S.C. 154(b) by 248 days.

(21) Appl. No.: 11/731,549

(22) Filed: Mar. 30, 2007

Related U.S. Application Data

(63) Continuation-in-part of application No. 11/600,570, filed on Nov. 16, 2006, now abandoned.

(51) Int. Cl.
*A44B 21/00* (2006.01)
(52) U.S. Cl. ........................ 24/265 H; 24/300
(58) Field of Classification Search .............. 24/265 H, 24/300, 301, 302, 298, 703.2, 703.3, 703.4, 24/703.5, 703.6; 119/792, 793, 795; 403/283
See application file for complete search history.

(56) References Cited

U.S. PATENT DOCUMENTS

| | | | |
|---|---|---|---|
| 2,500,561 A * | 3/1950 | Norton | 24/300 |
| 3,772,740 A * | 11/1973 | Seron | 24/298 |
| 4,426,079 A * | 1/1984 | Mason | 119/801 |
| 4,534,097 A * | 8/1985 | Mason | 29/432.2 |
| 5,325,568 A * | 7/1994 | Bruhm | 24/301 |
| 5,638,584 A * | 6/1997 | De Anfrasio | 24/265 H |
| 5,715,578 A * | 2/1998 | Knudson | 24/16 PB |
| 5,813,790 A * | 9/1998 | Goran, Jr. | 403/283 |
| 6,938,306 B2 * | 9/2005 | Joubert et al. | 24/300 |
| D525,861 S | 8/2006 | Mackey et al. | |
| 2002/0162196 A1 * | 11/2002 | Joubert et al. | 24/300 |

FOREIGN PATENT DOCUMENTS

WO  WO 2004045899 A1 *  6/2004

\* cited by examiner

*Primary Examiner*—Robert J Sandy
(74) *Attorney, Agent, or Firm*—M. P. Williams

(57) ABSTRACT

A transverse pin (17) pierces the core (16, 70) of a round or flat bungee cord (12, 69) to anchor the bungee cord within a molded base (11). A single wire sharply folded near its center (20) into a double strand (21, 22) is bent in a semi-circle to form a hook (25). Bent ends (30, 31) of the double strand are molded into the base.

9 Claims, 2 Drawing Sheets

FIG.6
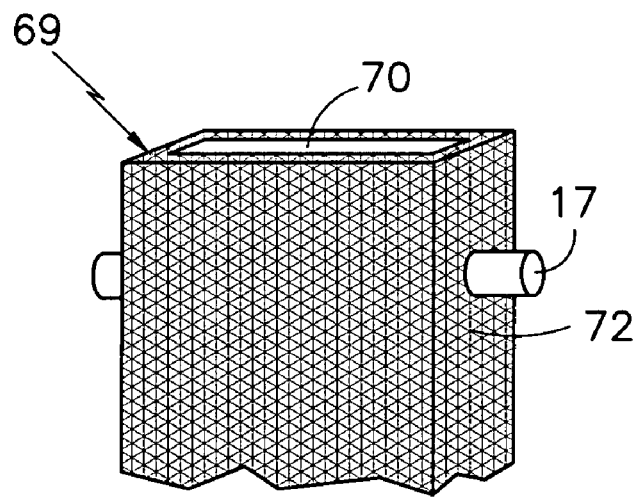
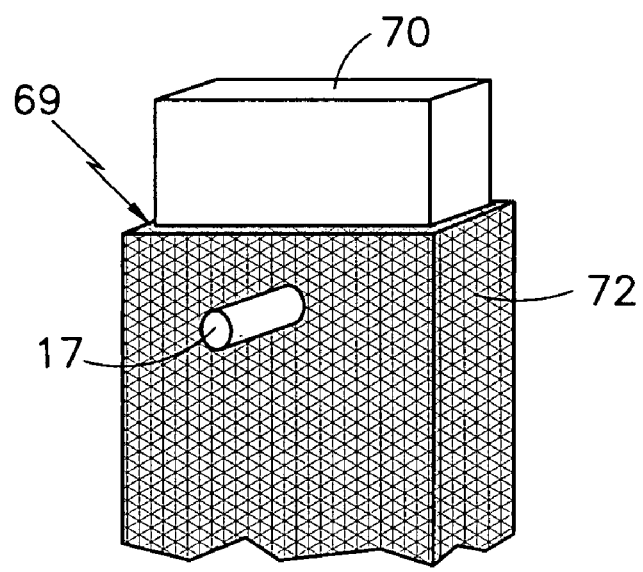
FIG.7

WIRE HOOK AND BUNGEE CORD WITH TRANSVERSE PIN IN MOLDED BASE

RELATED APPLICATION

This application is a continuation-in-part of U.S. patent application Ser. No. 11/600,570 filed on Nov. 16, 2006 now abandoned.

TECHNICAL FIELD

This invention relates to a bungee cord (stretch cord) having a terminus which includes a sharply bent wire forming a double strand, shaped into a hook and molded into a base with a bungee cord, which is anchored by a transverse pin piercing the bungee cord to provide longitudinal-movement restraint.

BACKGROUND ART

Bungee cords are extremely common and used in a variety of ways. The most simple and common bungee cord terminus is a stiff wire hook which connects with a coiled wire basket. The bungee cord is fed into the basket, bent back on itself, and the loop so formed is secured by a crimped hog ring. The position of one form of terminus known in the art is adjustable along the length of the cord; in other forms the position is fixed. A variety of still other forms are known to provide a variety of features to suit different applications. Many have open hooks; others rely on thin plastic or metal closures; some are plastic, and some are metal.

In the prior art, there are several ways utilized to anchor a bungee cord in a hook or other terminus, one of which is to tie the end of the bungee cord in a knot and have it engage a previously formed terminus, or have it molded into a terminus. However, this results in a very bulky terminus which gets in the way of anchoring the bungee cord in a variety of situations.

Another known method is to simply loop the end of the bungee cord through an eye formed in a proximal end of a hook, cinch it with a hog ring, and cast it into a molded terminus base. To make the terminus smaller, it has been known to use crimps or hog rings cast within a molded terminus. However, bungee cords become thinner as they are stretched by additional loading, and can become sufficiently thin so as to slip out of a crimp or hog ring.

DISCLOSURE OF INVENTION

Objects of the invention include: a bungee cord with a terminus which is low-cost and sturdy; a bungee cord with a terminus which is easily assembled which, however, is reliable; a bungee cord terminus longitudinal restraint anchor which is compact, which supports easy assembly, and which sustains loads that reduce cord diameter; and an improved terminated bungee cord.

According to the present invention, a bungee cord terminus includes a hook made of a single piece of wire folded sharply over itself to form a double strand having two mutually parallel legs, a hook is formed by bending the double strand from a distal end of the double strand into substantially a semi-circle; the proximal ends of the wire are bent at an angle, preferably substantially perpendicular, to the shank of the hook to engage the material of a molded base. If desired, the legs of the double strand may be separated by a distance about the thickness or less of the wire to support coating the wire with paint or other surface material.

According further to the present invention, a bungee cord is anchored into a molded base by means of a transverse pin which pierces the bungee cord, thereby acting as a longitudinal-movement restraint. The pin extends through substantially the center of a bungee cord having a single solid, round or flat core.

Utilizing a transverse pin to anchor the bungee cord in a molded base allows loading the bungee cord without the thinly-stretched, loaded bungee cord pulling out of the terminus, as it might do if it were held in place with a crimp or hog ring.

Other objects, features and advantages of the present invention will become more apparent in the light of the following detailed description of exemplary embodiments thereof, as illustrated in the accompanying drawings.

BRIEF DESCRIPTION OF THE DRAWINGS

FIG. 6 is a fragmentary perspective view of a flat bungee cord having a single, flat core with a pin through its long dimension.

FIG. 7 is a fragmentary perspective view of a flat bungee cord having a single, flat core with a pin through its short dimension.

MODE(S) FOR IMPLEMENTATION

Figure 1:
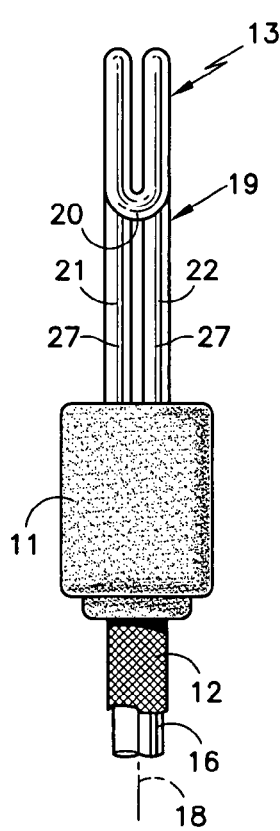
FIG. 1 is a front elevation view of a terminus secured to a bungee cord with a transverse pin according to the invention.
Figure 2:
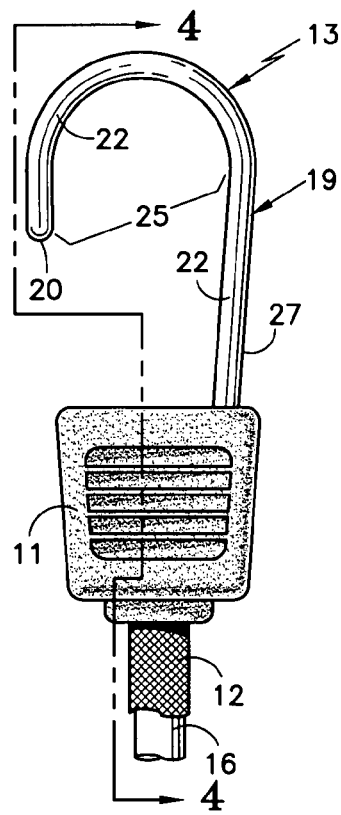
FIG. 2 is a side elevation view of the bungee cord and terminus of FIG. 1.
Figure 3:
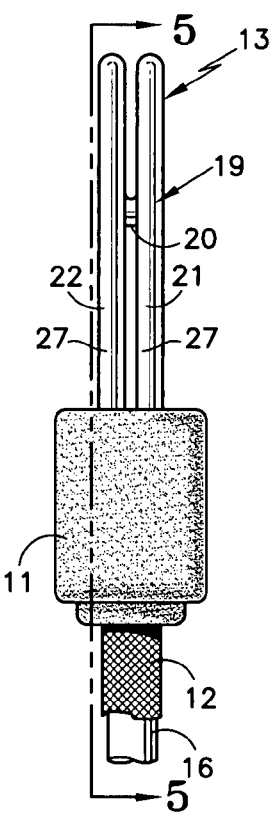
FIG. 3 is a rear elevation view of the bungee cord and terminus of FIG. 1.
Figure 4:
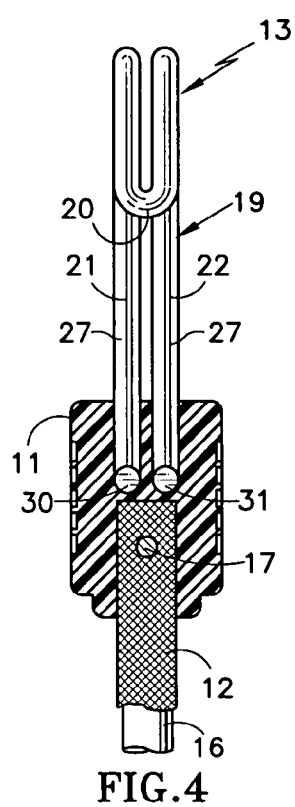
FIG. 4 is a front elevation view of the bungee cord and terminus of FIG. 1, partially sectioned on the line 4-4 of FIG. 2.
Figure 5:
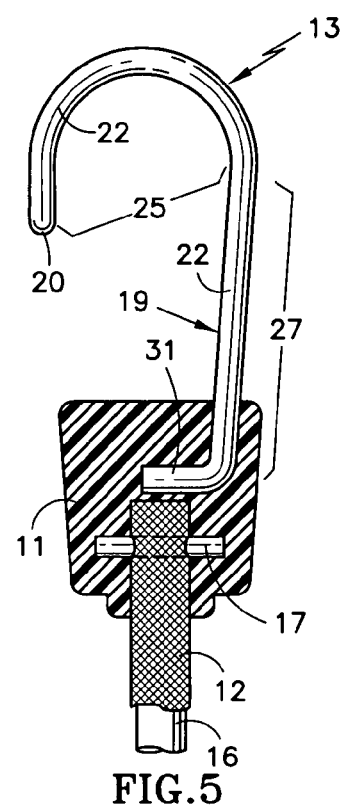
FIG. 5 is a side elevation view of the bungee cord and terminus of FIG. 1, partially sectioned on the line 5-5 of FIG. 3.

Referring to FIGS. 1-5, a molded base 11 captures a bungee cord 12 and a hook 13. A transverse pin 17 passes through the single, round, elastic core 16 of the bungee cord 12 substantially perpendicular to the longitudinal axis 18 of the bungee cord, to anchor the bungee cord 12 into the base 11. The transverse pin 17 cannot slip off the bungee cord 12 as a result of the reduction of cord diameter when the cord is stretched under a load. The hook 13 may be used with bungee cord longitudinal restraints other than the transverse pin, if desired in any application of the invention.

The hook 13 is formed of a single piece of wire 19 which is sharply folded over itself at about its midpoint 20 so as to provide a double strand 21, 22, the double strand being bent at its distal end 20 in substantially a semi-circle to form a hook portion 25. Two substantially straight shanks 27 are contiguous with the hook portion 25. The hook portion 25 need not be semicircular, but could be segments of other curves or polygons, instead. The term "substantially a semi-circle" is defined herein to include all such shapes.

Each proximal end 30, 31 of the wire 19 is bent so as to be at an angle, such as perpendicular, to the shanks 27, in the same plane as the semi-circular hook portion 25 of the hook 13. The bent ends 30, 31 secure the hook 13 in the molded base 11.

The wire hook 13 of the invention may be formed with a terminus which permits adjusting the position of the terminus along a bungee cord. Such a terminus is disclosed in U.S. Pat. No. 6,851,163.

The wire hook 13 of the invention may also be used with a fixed terminus other than that shown herein.

The invention is also useable with solid core flat bungee cords. As illustrated in FIG. 6, a flat bungee cord 69 may comprise a single, flat, elastic core 70 with suitable braid 72. The flat bungee cord 69 with the pin 17 passing through the long dimension of the core 70 is molded into the base 11 (FIGS. 1-5) of the terminus. Or as illustrated in FIG. 7, the pin 17 may pierce the short dimension of the core 70 of a flat bungee cord 69.

The transverse pin anchor of the invention may be used with any other sort of non-adjustable bungee cord terminus.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A terminated bungee cord, comprising:
   a molded base;
   a single piece of wire sharply folded over at about its middle forming a double strand of wire having two legs aligned in mutually parallel relationship, said double strand of wire being bent, beginning at a distal end of said double strand at the sharply folded middle of the wire, into substantially a semi-circle to form a double strand hook portion, the proximal end of said hook portion being contiguous with two substantially straight shanks of said double strand of wire, the ends of said double strand of wire being molded into said base; and
   a bungee cord having an end with a transverse pin piercing the bungee cord substantially perpendicular to the longitudinal axis of the bungee cord, with ends of the pin extending beyond the bungee cord, said end of the bungee cord and said pin molded into said base.

2. A bungee cord terminus according to claim 1 wherein:
   said two shanks are separated by a distance about the thickness of said wire or less.

3. A bungee cord terminus according to claim 1 wherein:
   the ends of said double strand of wire are bent at an angle with respect to the wire in said shanks to engage the material of said molded base.

4. A bungee cord terminus according to claim 3 wherein:
   the ends of said double strand of wire are bent substantially perpendicular to the wire in said shanks to engage the material of said molded base.

5. A bungee cord terminus according to claim 1 wherein:
   each of said ends is substantially co-planar with the hook portion of the same strand of wire.

6. A terminated bungee cord according to claim 1 wherein:
   said bungee cord has a single, elastic core; and
   said pin pierces the core of the bungee cord.

7. A terminated bungee cord according to claim 1 wherein:
   said core is round.

8. A terminated bungee cord according to claim 1 wherein:
   said core is flat.

9. A terminated bungee cord according to claim 8 wherein:
   said bungee cord has a single, flat, elastic core.

* * * * *